United States Patent Office 3,224,924
Patented Dec. 21, 1965

3,224,924
PROTECTIVE PADDING
Manfred von Ardenne, Dresden-Wiesser Hirsch, and Siegfried Panzer, Dresden, Germany, assignors to VEB Zentrale Entwicklung und Konstruktion für den Kraftfahrzeugbau, Kauffahrtei, Karl-Marx-Stadt, Germany
Filed Feb. 8, 1962, Ser. No. 171,885
8 Claims. (Cl. 161—68)

The present invention relates to an improvement of the padding applied to rigid parts at the interior of motor vehicles, for the purpose of protecting the occupants against serious bodily injury in the event of an accident.

Protective paddings of various designs are known, made of elastic material, especially of foam rubber. Its principal disadvantage is excessive elasticity which at the moment of impact with a part of the human body, as a result of a collison or similar accident causes a recoil action which has a force only slightly smaller than the impact force. This leads to heavy injury of the occupant, such as, for example, a broken neck on impact of the head.

Another significant disadvantage of foam rubber materials is their low energy absorbing capacity, due to composition and characteristics of the materials.

It is therefore desirable to provide a material which has uniform energy distribution in the event of an impact, and is characterized by a gradual counter energy rise, viz. a delayed rebound increase, when the padding is compressed by an impact. The material should preferably exhibit the feature of withstanding repeated compression, giving relatively high resilience in the event of frequent but low energy impacts.

For the event of a collision it is desirable to provide a material having a uniform energy absorption throughout its thickness, i.e., all over the retarding path. This material is characterized by a rebound force increasing by a step function.

Other objects and the structural details of the invention will be apparent from the following description in conjunction with the enclosed drawing, forming part of this specification, wherein—

Figure 1:
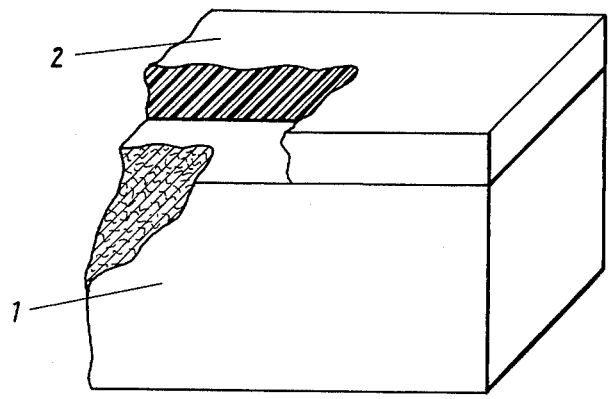
FIG. 1 shows a partial sectional view of a protective padding with an inelastic deformable plastic foam therein.

The inventive protective padding illustrated in FIG. 1, as a matter of example, consists of an inelastic deformable or compressible core 1 and a covering 2 consisting of an elastic deformable material. The layers of the protective padding, that is the core and the covering may be simply superimposed, or joined, one to the other by conventional means, e.g. adhesive techniques. This production step is not believed to need further explanation.

The covering 2 can be made of an elastic layer representing about 10 to 20% of the total thickness of the padding, for instance, 1 to 2 cm. For the material of the cover layer 2, elastomeric polyurethane foam, e.g. one commercially available under the trade designation "Moltopren," or a similar soft foam material may be employed.

The protective padding of the invention consists of two layers. The covering layer 2, upon which portions of the human body may impact in the event of a collision, is of the elastic sort. In can be compressed on being stressed, and if the stress is removed, the cover 2 returns to its initial position and regains its orginial size and form.

On the other hand, if the core layer 1 (in FIG. 1) or 3 (in FIG. 2) is stressed beyond a certain value, it is not compressed, but rather breaks down. This applies to the core 1 and to core 3, to be explained in more detail hereunder with reference to FIG. 2 of the drawing. The core will thus be destroyed (deformed in a plastic way) and cannot regain its initial size. According to the invention, the breakdown of core 1 (or 3) should begin at the moment when the cover 2 has been compressed to about 30 to 50% of its thickness.

The characteristics of the elastic foam material are best represented by stating that upon compression of this elastic cover layer 2 to 30 to 50% of its initial thickness, the resistance per square centimeter (expressed in kilograms) will be equivalent to the mass value per square centimeter expected to be braked, multiplied by the desired retarding value of the impacting body portion on the protective padding. At this stress the core (1 or 3) should break down.

Thus, for instance, the breaking strength value of the padding for the deceleration of the head of an occupant of a vehicle, upon impact with the padding, can be expressed as $$20 \text{ gr./cm.}^2 \cdot 75g = 1.5 \text{ kg./cm.}^2$$

wherein the first value corresponds to the mass to be braked (in grams per square centimeter); the second, to the retarding value (expressed in $g$=gravitational acceleration); and the third, to the resistance of the elastic covering 2 (in kilograms per square centimeter) at the moment when the core 1 begins to break down.

The novel main component of the padding is the core 1 for which inelastic deformable plastic foam material such as a polyurethane plastic foam material or a urea base plastic foam material can be utilized, such as semi-hard or hard graded "Moltopren" material, as referred to above of adequate strength material.

Figure 2:
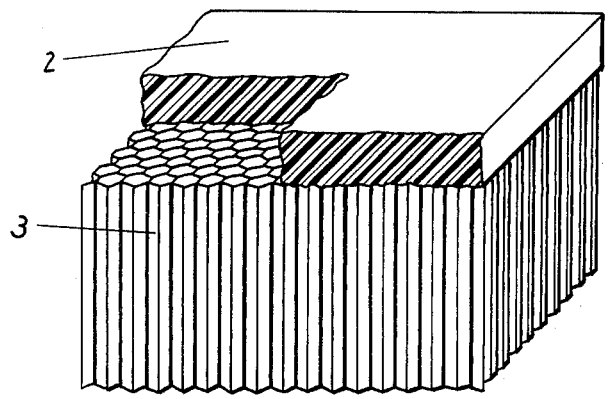
FIG. 2 shows a similar padding with artificial resin impregnated paper honeycombs.

According to the alternate embodiment illustrated in FIG. 2, the same elastic cover material 2 is utilized as shown in FIG. 1, but the core 3 consists of an inelastic artificial resin-impregnated paper honeycombs.

Figure 3:
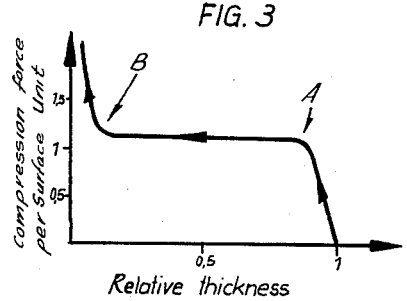
FIG. 3 is a diagram of compression characteristics for inelastic foamed materials.

The diagram FIG. 3 shows an approximation of the compressibility characteristics of the protective padding according to the invention. At the plateau range of the curve the compression strength value of the covering layer 2 reaches the above-mentioned breaking strength value of the core 1 or 3, which can be attained by using a suitable grade of resilience for cover 2.

The diagram of FIG. 3 will now be explained, starting at the intersection of the curve with the axis of abscissas (at the right hand side of the figure). This corresponds to a value "1" of the relative thickness, as the curve ascends; this illustrates the cover layer 2 being compressed.

At the first bend A of the curve, the breaking strength value of core 1 or 3 has been reached, following compression of the cover layer to about 30 to 50% of its initial thickness.

After this, a substantially horizontal plateau portion of the curve follows, the core being broken down under uniform absorption of impact energy.

At the second, upward bend B of the curve, the core 1 or 3 is completely destroyed and retains only about 10% of its initial thickness. Depending on the value of the impact energy per square centimeter of the protective padding, the core (1 or 3) will be destroyed to more or less of its depth or thickness.

The maximum energy per square centimeter that can be absorbed by the protective padding will be reached at the moment when the padding has been destroyed up to the bend B of the curve appearing in FIG. 3.

The magnitude of the maximum energy being absorbed increases with increasing thickness of the protective padding, and especially with increasing thickness of the inelastic deformable core 1 or 3.

The inelastic deformable core 3 according to FIG. 2 may consist of synthetic resin-impregnated paper honeycombs.

Because of its very low weight and its small knock-down size the paper honeycomb material will be preferred to foam materials for conditions where the impact direction approximately coincides with the direction of the longitudinal axis of the honeycomb cell.

The novel protective padding constructed in this manner has a high degree of energy absorption, is characterized by a constant retarding factor approximately equivalent to the stress toleration limit established for human beings, and exhibits low nonhazardous rebound speed energy caused by the resilience of the relatively thin cover layer 2.

With respect to frequently occurring instances of low impact energy, the padding is not destroyed as in these cases the elastic covering layer 2 features sufficient retarding action. Only in the event of a high impact energy associated with a severe accident, is the entire padding liable to be destroyed by the impact of a body it is braking. The cover layer 2 furnishes the uniform braking force distribution acting on the entire surface of the body being braked. In addition, at the moment of impact, a rapid but gradual increase of the retarding action is obtained. The very low weight of the protective padding according to the invention is another advantage.

Thus, when used in conjunction with safety belts, a "safe speed range" is obtained by the application of the inventive protective padding, depending on the thickness of it and particularly on that of its core (1 or 3). In city traffic with relatively low speeds, sufficient security for the occupants against accident injury is provided by the use of the padding, even without having to resort to safety belting.

Similar protective padding, but of respectively higher retarding efficiency, is also suitable for making a bumper-like bulb-bar surrounding vehicles for the purpose of obtaining an additional "safe speed range." For the inelastic deformable core of this bulb-bar a construction may be used make up of paper honeycombs filled with hard-graded "Moltopren." Aluminium or sheet steel honeycombs can also be used. The elastic cover requires a degree of strength which is only attainable with massive rubber-elastic materials.

What we claim is:

1. Padding arrangement particularly adapted for use as a protective padding in motor vehicles and the like, consisting essentially of an inner inelastic deformable core and an outer elastic compressible cover layer thereon, said inner core being subject to permanent deformation when said outer layer is compressed to about 30–50% of its original thickness.

2. Padding arrangement according to claim 1, wherein said core is made of a material with constant energy absorbing characteristics.

3. Padding arrangement according to claim 2, wherein said core material consists of a plastic foam.

4. Padding arrangement according to claim 3, wherein said plastic foam has a polyurethane base.

5. Padding arrangement according to claim 3, wherein said plastic foam is formed of a urea resin.

6. Padding arrangement according to claim 1, wherein said core is made of paper honeycombs impregnated with artificial resin.

7. Padding arrangement according to claim 1, wherein said cover layer consists of foam rubber.

8. Padding arrangement according to claim 1, wherein said cover layer has a thickness constituting between 10 to 20% of the entire thickness of the padding.

References Cited by the Examiner

UNITED STATES PATENTS

| | | | |
|---|---|---|---|
| 2,892,489 | 6/1959 | Hurley | 154—154 |
| 3,051,601 | 8/1962 | Schick | 154—54 |

FOREIGN PATENTS

| | | |
|---|---|---|
| 750,239 | 6/1956 | Great Britain. |

EARL M. BERGERT, *Primary Examiner.*